J. D. KARLE.
DETACHABLE HANDLE.
APPLICATION FILED JUNE 22, 1916.
1,271,716.
Patented July 9, 1918.
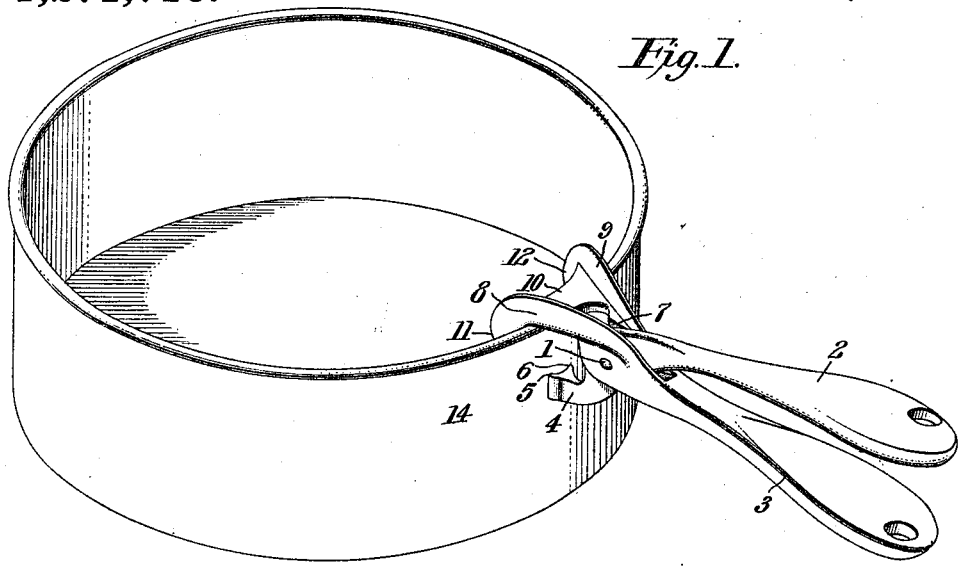
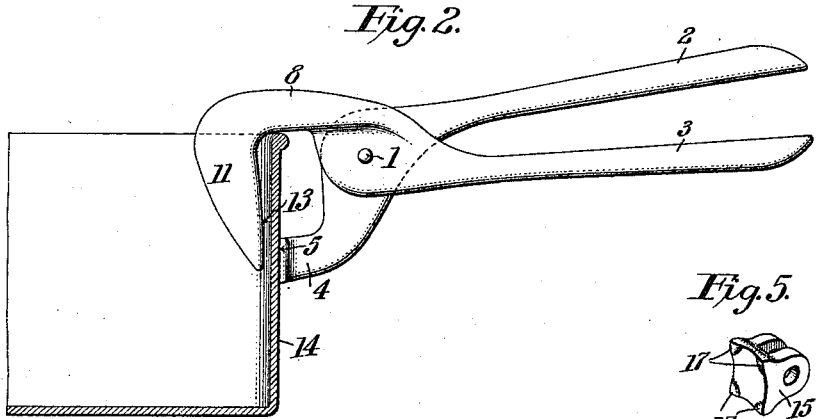
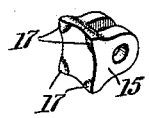
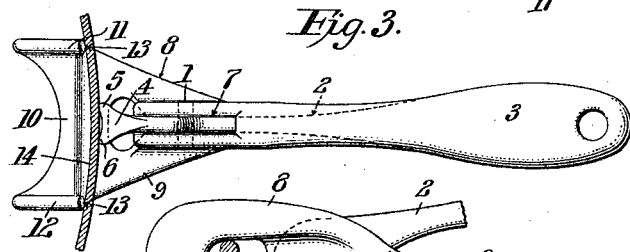
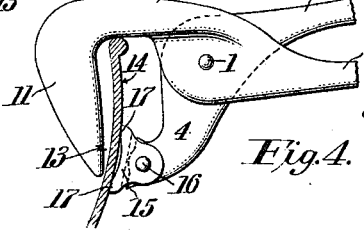
WITNESSES:
L. E. Fischer
W. P. Stewart
INVENTOR
John D. Karle.
BY
ATTORNEY

UNITED STATES PATENT OFFICE.

JOHN D. KARLE, OF ROSELLE PARK, NEW JERSEY.

DETACHABLE HANDLE.

1,271,716.  Specification of Letters Patent.  Patented July 9, 1918.

Application filed June 22, 1916. Serial No. 105,173.

*To all whom it may concern:*

Be it known that I, JOHN D. KARLE, a citizen of the United States, residing at Roselle Park, in the county of Union and State of New Jersey, have invented certain new and useful Improvements in Detachable Handles, of which the following is a specification, reference being had therein to the accompanying drawings.

This invention relates to improvements in detachable handles and has for its primary object to provide improved means for manipulating such utensils as are commonly employed in the preparation of food and to that end there are herein illustrated and described durable and convenient means for placing upon or removing from the ordinary stove, range or other contrivances employed for heating and cooking purposes, such utensils whether they are rimmed or rimless as pans, pots, kettles, etc., common to the culinary art.

While many earlier devices have been heretofore made for facilitating the manipulation of cooking utensils, it is believed that the present improved means is the first to meet the requirements of utensils having either circular, straight, convexed, concaved or angular side walls constructed with or without rims such as are usually formed by folding or rolling the free edge of the metal over and upon itself.

The invention will be understood by reference to the accompanying drawings in which Figure 1 is a perspective view of the present improvement as applied to one form of cooking utensil commonly employed. Fig. 2 is a side view of the same with part of the utensil shown in section. Fig. 3 is a bottom plan of the improvement as shown in Fig. 2 and illustrating the manner in which the side of a utensil is gripped. Fig. 4 illustrates a modified form of the improvement particularly adapted for all the various types of utensils and Fig. 5 is a perspective view of the shoe- or gripping-plate of the detachable handle illustrated in Fig. 4.

Referring to the drawings, the improvement consists of a detachable handle comprising levers pivotally connected by the pin 1, the rearwardly extending members 2 and 3 serving as handles. Beyond its pivotal point, the lever of which the handle 2 is a part extends downwardly at approximately a right angle to form a gripping jaw 4, suitably curved on its front face to form contact surfaces 5 and 6. The lever of which the handle 3 is a part is slotted at 7 to provide a passage-way for the other lever and is constructed with divergently extending ribs or arms 8 and 9 braced by the integral plate 10 and terminating in jaws 11 and 12 extending downwardly at approximately right-angles to the direction of the length of the handle 3. Each of the jaws has a contact or gripping surface as 13 coöperating with the contact surfaces 5 and 6 of the jaw 4 in gripping the side wall 14 of a utensil. It will be noted that the opposed jaws are positioned in relation to each other in such a manner that the line of action of the jaw 4 is intermediate the lines of action of the jaws 11 and 12 in order to provide means for gripping a greater variety of utensils.

In the modification illustrated in Figs. 4 and 5 of the drawings, a shoe- or gripping-plate 15 is pivotally secured to the jaw 4 by means of the pivot-pin 16. The front or contact face of this gripping-plate is preferably curved in transverse directions to provide four gripping points as 17 and this feature, together with the pivotal connection described, enables the jaw to adapt itself to any curvature or inclination of the side walls of the utensil without placing the handles 2 and 3 in an inconvenient position. It is of course obvious that the jaws 11 and 12 may be provided with gripping-plates similar to plate 15 if desired. It will also be readily understood that a detachable handle of the type described does not depend upon a rim of the side wall of a utensil, but is adapted to firmly grip the wall at any depth within the limits of the lengths of the jaws.

Having thus set forth the nature of the invention, what I claim herein is:—

A detachable handle comprising pivotally connected levers, one of said levers terminating in spaced, downwardly extending jaws, and the other of said levers terminating in a single jaw opposed to said spaced jaws and including a pivotal gripping plate curved in transverse directions to form a plurality of contact points.

In testimony whereof, I have signed my name to this specification.

JOHN D. KARLE.

Copies of this patent may be obtained for five cents each, by addressing the "Commissioner of Patents, Washington, D. C."